Jan. 18, 1966  S. NITZSCHE ETAL  3,230,121
METHOD OF APPLYING PROTECTIVE SILICONE RUBBER TAPE COVERING
LAYER TO HOLLOW GLASS ARTICLES
Filed March 13, 1961

INVENTORS
SIEGFRIED NITZSCHE
MANFRED WICK
KARL-HERMANN HUBAL
BY
Lawrence R. Hoby
ATTORNEY United States Patent Office 3,230,121
Patented Jan. 18, 1966

3,230,121
METHOD OF APPLYING PROTECTIVE SILICONE RUBBER TAPE COVERING LAYER TO HOLLOW GLASS ARTICLES
Siegfried Nitzsche, Manfred Wick, and Karl H. Hubal, Burghausen, Bavaria, Germany, assignors to Wacker-Chemie G.m.b.H., Munich, Bavaria, Germany
Filed Mar. 13, 1961, Ser. No. 95,297
Claims priority, application Germany, Mar. 14, 1960, W 27,448
5 Claims. (Cl. 156—162)

This invention relates to glass and ceramic apparatus covered and insulated with silicone rubber.

Glass, ceramic and plastic apparatus, piping and other equipment are being used more and more widely in industry and particularly in the chemical industry. Such equipment offers corrosion resistance and easy installation as attractive features. Particularly useful in the chemical industry are the high temperature glass and ceramic materials exhibiting low coefficients of expansion, and high thermal strengths. However, such glass and ceramic materials remain sensitive to percussion and impact. This sensitivity to impact may result in excessive breakage and lead to losses in time and money, hence the use of ceramics and glass has been limited to those applications where impact is practically nil.

There has been a continuing search for a simple method for protecting tubes and apparatus components made of glass, ceramics and hard, percussion-sensitive plastics against percussion and impact breakage. A further goal is to give such components thermal insulation.

Some solutions to this problem have been offered. The foremost solution involved wrapping or otherwise coating the glass and ceramic components with glass cloth, asbestos or cotton bandages treated with tar, sizing or synthetic resins. The wrapping and coating as noted accomplished some improvement in impact resistance and insulation but the wrappings and coatings were not sufficiently elastic to prevent breakage from moderate and heavy blows though lighter impacts were absorbed. Some degree of heat stability was present in the wrappings but they were not sufficiently heat stable to permit many standard reactions to be carried out in the glassware so wrapped or coated. The wrappings were not transparent hence there was no opportunity to visually follow the reactions and a very important advantage achieved with the use of glass in the chemical industry was lost.

Protective layers of polyester resins with glass fiber reinforcements have also been applied to glass bodies and ceramic bodies. This protective layer was usually applied by winding the glass or ceramic with a glass fiber tape impregnated with the polyester resin. Such protection made the glass and ceramic articles less sensitive to impact but of course all transparency was lost.

It is the object of this invention to introduce an elastic protective coating or winding surrounding glass or ceramic apparatus. An elastic winding having a maximum prestress such that excess pressure in the apparatus will counteract the tensile stress created in the walls of the tube is also an object of this invention. Another object is a transparent protective winding or coating for glass. Another object is a coating or winding for glass or ceramic components having heat stability such that high temperature reactions can be carried out in the glass or ceramics covered therewith. Other objects and advantages of this invention are detailed in or will be apparent from this disclosure and claims.

This invention is a protective and heat insulating covering for frangible solids such as impact-sensitive articles of glass, ceramics and plastics, consisting of a coating or wrapping of silicone rubber.

The attached drawings are illustrative of several embodiments of the invention.

Figures 1, 2:
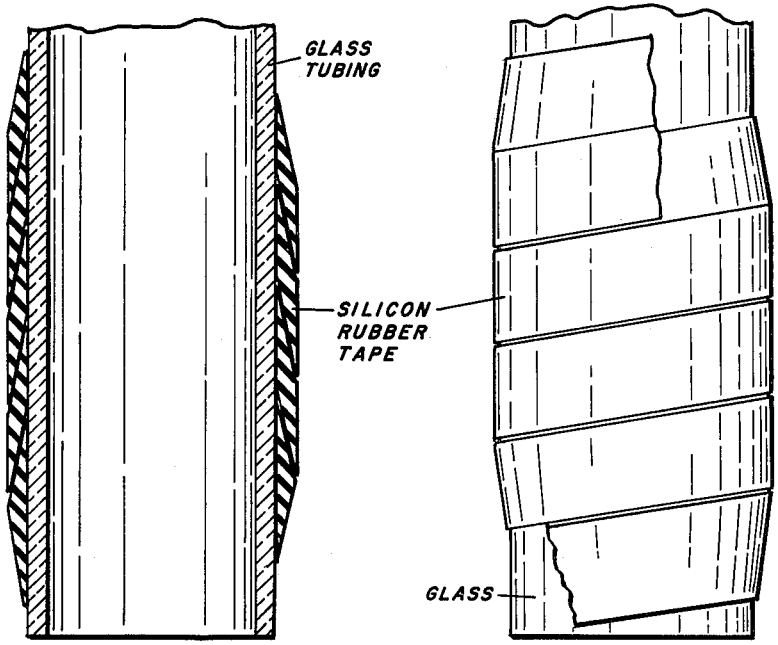
FIG. 1 is a longitudinal section of a single winding of a tubular body with a silicone rubber tape having a triangular profile; due to the distortion of the triangular profile upon pulling the tape, a lozenged structure is obtained.
FIG. 2 is an external view of a single winding with a tape of a triangular profile.
Figures 3, 4:
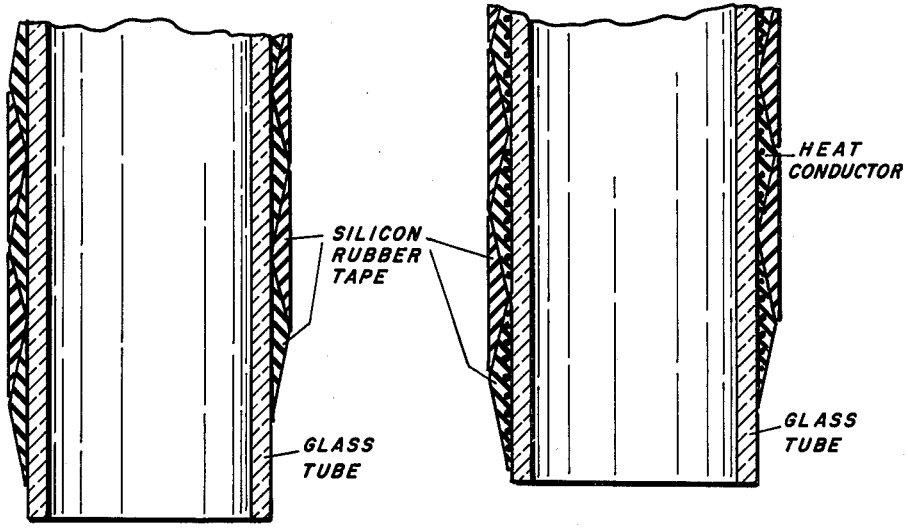
FIG. 3 is a longitudinal section of a double winding with a tape of triangular profile.
FIG. 4 is a longitudinal section of a double winding with imbedded heating conductors.

The silicone rubbers employed herein are well-known elastomeric materials based on diorganosiloxane polymers. These materials are thoroughly described in the art in such United States patents as: 2,480,620; 2,494,920; 2,541,137; 2,560,498; 2,568,672; 2,571,039; 2,572,227; 2,658,882; 2,684,957; 2,718,512; 2,721,857; 2,723,964; 2,728,743; 2,759,904; 2,803,619; 2,819,236; 2,833,742; 2,843,555; 2,854,698; 2,863,846; 2,890,188; 2,902,467; 2,927,907; 2,927,908; 2,934,515; and 2,956,032. Particularly useful are self-adhering silicone rubbers such as are disclosed in United States applications Serial No. 6,872, filed February 5, 1960; Serial No. 6,871, filed February 5, 1960; and Serial No. 9,428, filed February 18, 1960, as well as in British Patent No. 859,284 and French Patent No. 1,221,501.

Also operative herein are the so-called "bouncing putties" but the fluid nature of such materials requires either incorporation of a special filler to prevent fluid flow or application of an outer layer of cloth or other film to hold the material in place. These bouncing putties are described in United States Patent No. 2,541,851 as well as in German Patents Nos. 954,446, 1,016,870 and 1,045,092.

The transparent self-adhering silicone rubber tapes are preferred for use herein.

In addition to the silicone rubber a host of elastomeric materials are obviously of utility herein. The following is a list of such materials that can be substituted for the silicone rubber herein. Natural rubber, synthetic organic rubber such as butyl rubber, butadiene-acrylonitrile copolymers (Buna N), polychlorobutadiene (neoprene), acrylic rubbers based on alkyl esters of acrylic acid, chlorosulfonated polyethylene, fluorocarbon elastomers such as copolymers of chlorotrifluoroethylene and vinylidene chloride fluoroacrylic rubbers and copolymers of vinylidene fluoride and hexafluoropropylene as well as softened thermoplastics with elastomeric characteristics such as soft polyvinyl chloride, polyisobutylene and soft polymethacrylates.

The natural rubber and most of the synthetic organic rubbers are useful on glassware wherein temperatures up to about 130° C. are employed. The fluoroelastomers and silicone rubbers can be used at higher temperatures up to 250° C. or more.

It is obvious the elastomers which are clear and/or transparent offer a decided advantage for use herein. Silicone rubbers and chlorosulfonated polyethylenes can be prepared as transparent tapes or sheets and exhibit excellent characteristics as wrappings and coatings on glass. The transparent silicone rubbers are known and are commercially available. Such rubber is specifically disclosed in U.S. Patents Nos. 2,759,904 and 3,036,985.

The silicone rubber or other elastomer can be applied to the glass or ceramic apparatus by any desired method. Two general methods proven useful are application of elastomer as a tape or sheet and application of the elastomer as a paste, solution or dispersion.

Tapes, sheets and other relatively planar forms of silicone rubber and other elastomers are readily prepared by extrusion, calendering or any other desired method. The tapes and sheets may be self-adhering (see Canadian Patent No. 588,913, issued December 15, 1959) thus requiring no bonding agents. On the other hand, many useful silicone rubber tapes require bonding agents well known in the art to secure the desired adhesion to glass. Partially vulcanized tapes and tapes vulcanized on one side only are also useful and can be adhered to glass and to themselves to build up layers of elastomer on the glass.

One great advantage realized with silicone rubber tapes lies in the fact that they may be applied to the glass or ceramic apparatus under pre-stress and the pre-stress remains high even after exposure to high temperatures. Thus glass piping and other cylindrical tubes of glass or ceramic can be strengthened by applying a silicone rubber tape under pre-stress conditions. Such a cylindrical tube under excess internal pressure bears twice as great a load in the radial direction as in the axial direction hence the source of a break can only be traced to the tensile stresses present in the periphery of the tube wall. If a silicone rubber layer is applied with a pre-stress of 3 atmospheres to such a cylindrical tube, and the tube is loaded with an excess internal pressure of 4.5 atmospheres, then the tensile stress in the periphery of the tube wall is equal to only an excess pressure of 1.5 atmospheres.

Silicone rubber can typically be elongated more than 200% hence tapes made of silicone rubber can be wound very tightly under tension. The tension or pre-stress is maintained even at high temperatures. The glass articles wound with silicone rubber tape are under very high pre-stress and can absorb much greater internal pressure than would be possible without the winding and at the same time the transparency of the glass need not be lost when transparent silicone rubber tapes are used.

The high temperature properties, pre-stress capabilities, transparency and other properties of silicone rubbers make them the preferred material for use herein.

The use of tapes and sheets as windings on glass has the further advantage that glass splinters and other glass pieces tend to be held in place even if the glass breaks during operation. This protection can be enhanced by imbedding wire armor or even glass cloth in the tapes. Another advantage realized with silicone rubber windings is that flange joint grooves can be rewound and an absolute vacuum seal obtained.

The tapes employed herein may have a wide variety of cross-sectional shapes. One excellent embodiment is tape of triangular cross section (e.g. see Canadian Patent No. 588,913). The triangular tapes are easy to apply employing overlapping winding to give a smooth outer surface. Other forms of tapes including feather-edged tapes, lens-shaped tapes as well as decorated and color coded tapes can be employed.

The rubber tapes employed herein can be foamed rubber or can consist of one layer of solid rubber with a layer of foamed rubber superimposed. Heating wires can be imbedded in the tape or the tape can be made conductive by incorporating graphite or metal powder (e.g. copper powder) in the rubber. Another very interesting embodiment comprises using hollow tapes or tubing as the winding material and thereby introducing a means for heating or cooling the glass equipment by running hot or cold liquid through the tubing.

The second method for covering glass or ceramics with the silicone rubber comprises application in solutions, dispersions, pastes and the like. A cold curing silicone rubber (see U.S. patent application Serial No. 602,081, filed August 3, 1956; U.S. Patent No. 2,843,555; and U.S. Patent No. 2,927,907) can be dissolved in an organic solvent such as xylene, benzene and the like. The solution can be sprayed, brushed, flowed or otherwise applied onto the glassware surface and the solvent driven off. The rubber layer so deposited cures at room temperature. Additional layers of rubber can be applied until the desired coating thickness is achieved. Armor wire, heating wire, glass cloth and other materials can be imbedded between layers of rubber laid up according to this method.

A solid rubber base can be applied and thereafter foams such as natural rubber foam, silicone rubber foam and even polyurethane foams can be superimposed. Furthermore, a combination of coating applied from dispersion and silicone rubber tape can be employed herein.

It was completely unexpected that such coating or bandaging of glass, ceramic and plastic apparatus with self-adhering tapes or foils prepared from silicone rubbers claimed in the cited patents would create an effective protection for this apparatus without also entailing the previous disadvantages. Clear and highly transparent tapes and foils can be prepared from these silicone rubbers, they are easily wound about the apparatus components and will seal to a homogeneous jacket upon contact with themselves which is evidenced by high rebound elasticity and singularly high heat and aging stability. No adhesives are necessary when using these tapes and foils nor any application of heat so that they may be applied easily and effortlessly even to inaccessible places.

The preferred silicone rubbers used for the present discovery can be converted to tapes or foils on the extruders and calenders used in plastics and rubber plants and supplied in vulcanized form in rolls. Protection of the glass, ceramic and plastic apparatus then follows by simply overlap winding these tapes and foils in situ on the apparatus parts to be protected. The surprising and unforeseen element is that a layer of only 0.5 to 0.8 mm. depth is perfectly sufficient to protect the apparatus against impact because of the great elasticity of the protective layer. Blows to such apparatus quite often come from tools which are dropped during installation or during repair. The silicone rubbers of the present discovery possess the surprising property that the more violent the blow, the greater will be the rebound elasticity. They possess this property in common with the above-mentioned "bouncing putty," to which they are chemically related.

The following examples are included to aid those skilled in the art to understand and practice this invention.

*Example 1*

A tube of high strength, high temperature glass is wound with a self-adhering silicone rubber insulating tape in such a manner that the depth of the silicone rubber layer is 1.2 mm. The silicone rubber tape comprised a vulcanized mixture of 100 parts by weight of an essentially dimethyl siloxane gum containing about 5 mol percent of phenylmethylsiloxane units and less than 1 mol percent of methylvinylsiloxane units, 30–40 parts by weight of silica filler which may be treated to exhibit $(CH_3)_3Si$ groups on the silica surface, about .25 percent by weight of ethyl borate and .5 parts dicumyl peroxide mixed with 2.5 parts ethylpolysilicate as vulcanizing agent. In spite of the winding one can be seen through the transparent silicone rubber and the glass tube. A 500 g. hammer is dropped on the glass tube after the winding from a height of 2 m. The protective layer as well as the glass tube remain undisturbed. The same is true when the protective coating and glass tube are aged for 200 hours at 250° C. before the test. An unprotected glass tube of the same quality is completely annihilated by the falling hammer.

*Example 2*

A vulcanized or a semi-vulcanized tape or a foil of ordinary, not self-adhering silicone rubber is coated with a silicone rubber adhesive solution and is then wound. This adhesive may be a cold vulcanizing solution, for example. It may also be a two-component adhesive containing cold hardening rubber; one component, for instance, contains the dibutyltindilaurate as catalyst, the other component contains, viz., polyorganohydrogensiloxane as cross linker. The glass surface is brushed with the component which contains the dibutyltindilaurate, then the rubber tape is impregnated with the component which contains the H-Siloxane, and finally the glass body is wound with it whereupon hardening will follow within 5 minutes.

Another possibility resides in the fact that the glass body may be coated by brushing or dipping with the help of a silicone rubber solution which may be either cold or heat vulcanizable. Preferably, one would work with a 30% solution of a cold vulcanizing brushing material which contains butanol to extend the processing time and which is hardened with tetraethylsilicate and dibutyltindilaurate.

That which is claimed is:

1. A method for insulating and improving impact resistance of frangible solids selected from the group consisting of hollow glass, plastic and ceramic articles consisting of applying thereto at least one layer of self-adhering silicone rubber tape, said tape being applied under tension.

2. The method of claim 1 wherein the frangible solids are hollow glass articles.

3. The method of claim 1 wherein the silicone rubber tape has a triangular cross-section.

4. The method of claim 1 wherein the silicone rubber tape is transparent.

5. The method of claim 1 wherein wire is imbedded in successive layers of silicone rubber.

References Cited by the Examiner

UNITED STATES PATENTS

| | | | |
|---|---|---|---|
| 599,203 | 2/1898 | Stenger et al. | 154—53.5 |
| 1,763,360 | 6/1930 | Kean | 138—153 XR |
| 2,258,218 | 10/1941 | Rochow | 117—124 |
| 2,606,574 | 8/1952 | Lefebvre | 138—140 XR |
| 2,750,314 | 6/1956 | Bemmels | 154—53.5 |
| 2,827,440 | 3/1958 | Arrandale et al. | 117—124 |
| 2,868,670 | 1/1959 | Van Laar et al. | 117—124 |
| 2,882,183 | 4/1959 | Bond et al. | 117—72 XR |
| 2,908,555 | 10/1959 | Grosskopf | 23—254 |
| 2,951,277 | 9/1960 | Youngs | 156—162 XR |
| 2,975,088 | 3/1961 | Rossman et al. | 156—162 XR |

FOREIGN PATENTS

| | | |
|---|---|---|
| 588,913 | 12/1959 | Canada. |
| 1,042,224 | 10/1958 | Germany. |
| 1,076,357 | 2/1960 | Germany. |

OTHER REFERENCES

Modern Laboratory Appliances, Catalog 59, New York, Fisher Scientific Company, 1959, p. 546.

EARL M. BERGERT, *Primary Examiner.*

CARL F. KRAFFT, *Examiner.*